US007317958B1

(12) United States Patent
Freed et al.

(10) Patent No.: US 7,317,958 B1
(45) Date of Patent: Jan. 8, 2008

(54) APPARATUS AND METHOD OF ADDITIVE SYNTHESIS OF DIGITAL AUDIO SIGNALS USING A RECURSIVE DIGITAL OSCILLATOR

(75) Inventors: Adrian Freed, Berkeley, CA (US); Todd Hodes, Berkeley, CA (US); John Hauser, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/521,641

(22) Filed: Mar. 8, 2000

(51) Int. Cl.
*G06F 17/00* (2006.01)

(52) U.S. Cl. .......................................................... 700/94

(58) Field of Classification Search .................. 381/10; 700/94; 84/622, 623, 659, 661; 708/8, 9, 708/251, 271
See application file for complete search history.

(56) References Cited

U.S. PATENT DOCUMENTS

| | | | | | |
|---|---|---|---|---|---|
| 4,910,699 | A | * | 3/1990 | Capps et al. | 708/491 |
| 4,937,873 | A | * | 6/1990 | McAulay et al. | 704/265 |
| 5,109,417 | A | * | 4/1992 | Fielder et al. | 704/205 |
| 5,504,833 | A | | 4/1996 | George et al. | 395/2.2 |
| 5,686,683 | A | | 11/1997 | Freed | 84/625 |
| 5,729,577 | A | * | 3/1998 | Chen | 375/334 |
| 5,880,392 | A | | 3/1999 | Wessel et al. | 84/659 |
| 6,029,133 | A | * | 2/2000 | Wei | 704/265 |
| 6,163,836 | A | * | 12/2000 | Dowling | 712/37 |

FOREIGN PATENT DOCUMENTS

JP 03125513 A * 5/1991

OTHER PUBLICATIONS

Hodes T et al, "A fixed-point recursive digital oscillator for additive synthesis of audio", Mar. 15-19, 1999; Acoustiic, Speech, and Signal processing, 1999. I'99. Proceedings. 1999 IEEE International Conference on. vol. 2, pp. 993-996 [online] [retrieved on Jul. 07, 2004]: Retrieved from the Internet:<http://ieeexplore.ieee.org/iel4/6110/16374/00759867.pdf?tp=&arnumber=759867&isnumber=16374&arSt=993&ared=996%20vol.2&arAuthor=Hodes%2C+T.%3B+Hauser%2C+J.%3B+Wawrzynek%2C+J.%3B+Freed%2C+A.%3B+Wessel>.*

Hodes, Todd. "Recursive Oscilliators on a Fixed-Point Vector Microprocessor for High Performance Phase-Accurate Real-Time Additive Synthesis". Aug. 6, 1998; Networked Computer Science Technical Reports Library [online], pp. 1-40. [retrieved on Jul. 7, 2004]. Retrieved from the Internet:<URL: http://sunsite.berkeley.edu/Dienst/Repository/2.0/Body/ncstrl.ucb/CSD-98-1007/pdf>.*

* cited by examiner

*Primary Examiner*—Sinh Tran
*Assistant Examiner*—Andrew C Flanders
(74) *Attorney, Agent, or Firm*—Michaelson & Associates; Peter L. Michaelson; George Wolken, Jr.

(57) ABSTRACT

A method of performing additive synthesis of digital audio signals using a novel recursive digital oscillator includes the step of receiving digital audio signal frames wherein each digital audio signal frame includes a set of frequency, amplitude, and phase components represented as coefficients of variables in a mathematical expression. Each digital audio signal frame thereby includes a frequency coefficient representation. Converted frequency coefficients are formed by linearly re-mapping the bits of the frequency coefficient representation and adding range extension via a shift amount in order to bias audio reproduction accuracy toward low frequency signals. Additive synthesis is then performed with the converted frequency coefficients.

4 Claims, 3 Drawing Sheets

APPARATUS AND METHOD OF ADDITIVE SYNTHESIS OF DIGITAL AUDIO SIGNALS USING A RECURSIVE DIGITAL OSCILLATOR

BRIEF DESCRIPTION OF THE INVENTION

This invention relates generally to the processing of digital audio signals. More particularly, this invention relates to a technique for additive synthesis of digital audio signals using a recursive digital oscillator.

BACKGROUND OF THE INVENTION

Additive synthesis is a signal synthesis technique based on the Fourier Theorem. This theorem states any signal can be decomposed into a set of constituent sine waves, and that the sum of the constituents will reconstitute the original. Additive synthesis is classified as a receiver-based synthesis algorithm, but differs from receiver-based schemes, such as subtractive synthesis and sampling, in that it is represented in the spectral (frequency) domain rather than the time domain.

There are many benefits in the use of additive synthesis for sound production in computer music applications. These include expressive musical control over fine timbral distinctions, perceptually relevant parameterizations, sample rate independence of timber description, availability of many analysis techniques, high control bandwidth, and multiple dimensions for resource allocation/optimization.

The challenge of the additive synthesis technique is the computational intensity of the separately controllable sinusoidal partials. A single low frequency piano note can require hundreds of time-varying sinusoids for accurate reproduction. Musically effective use of additive synthesis in live performance can require the ability to control many hundreds or even thousands of sinusoidal partials in real-time.

This computational challenge is addressed by resolving two issues: which hardware architecture to use and which sinusoid generation algorithm to use on the selected architecture. Digital Signal Processors or vector processors are a good selection for the data type and associated computational demands. Unfortunately, such architectures do not always support full-range (i.e., floating-point) arithmetic; fixed point may be all that is provided. There is always a large demand for low-cost implementations. Therefore, it is desirable to be able to exploit a relatively inexpensive, moderate-precision arithmetic hardware architecture, such as a 16-bit processor.

A number of sinusoidal partial production techniques may be used on a selected hardware architecture. These techniques can be placed in three classes: those that implement recursive filters, those using table-lookup, or those that work in the transform-domain using techniques, such as the inverse fast fourier transform. The transform-domain approach is most advantageous for applications requiring many sinusoids and for which some error in phase and amplitude and some latency is acceptable. The lookup technique is the most widely used for applications requiring a few sinusoids at a very high data rate, such as radio frequency communications. Recursive oscillators have several advantages, including the inherent fine-grain exposure of data parallelism, the far more limited demand on the memory system compared to table look-ups, the lower induced latency than with a transform-domain approach, the latency flexibility, and/or the attainable phase accuracy.

The primary problem with digital recursive oscillators is managing long-term stability as rounding and truncation errors accumulate. Another problem with recursive oscillators is providing sufficient frequency coefficient resolution.

In view of the foregoing, it would be highly desirable to provide an improved technique for processing real-time partials on a general purpose hardware architecture. Ideally, the technique could be readily implemented on a moderate-precision arithmetic hardware architecture, such as a 16-bit processor. The technique should address the problem of error accumulation inherent in recursive methods. In addition, the technique should provide sufficient frequency coefficient resolution.

SUMMARY OF THE INVENTION

The method of the invention is directed toward performing additive synthesis of digital audio signals with a recursive digital oscillator. The method includes the step of receiving digital audio signal frames wherein each digital audio signal frame includes a set of frequency, amplitude, and phase components represented as coefficients of variables in a mathematical expression. Each digital audio signal frame thereby includes a frequency coefficient representation. Converted frequency coefficients are formed by linearly re-mapping bits of the frequency coefficient representation to bias audio reproduction accuracy toward low frequency signals. Additive synthesis is then performed with the converted frequency coefficients.

The method of the invention also includes receiving digital audio signal frames wherein each digital audio signal frame includes a set of frequency, amplitude, and phase components, represented as coefficients in the standard mathematical expression of the Fourier theorem; the step of converting frequency components of each digital audio signal frame to bias reproduction accuracy toward lower frequencies in the audio spectrum through the use of a re-mapping of the bits of the component and through the addition of a range-extending shift amount; and the step of performing additive synthesis via the use of an efficient recursive digital oscillator structure that uses the converted frequency coefficients internally.

The apparatus of the invention includes a computer readable memory to direct a processor to function in a specified manner. The computer readable memory includes a first set of executable instructions to receive digital audio signal frames wherein each digital audio signal frame has a set of specified frequency values expressed as a bit sequence. A second set of executable instructions transforms the bit sequence to represent lower frequencies with more significant bits and higher frequencies with less significant bits. A third set of executable instructions facilitates additive synthesis of the digital audio signal frames in a reduced-precision recursive digital oscillator. Sound is produced as multiple recursive oscillators operate in parallel.

The invention provides an improved technique for real-time production of summed variable-frequency sinusoids on a general purpose hardware architecture. The technique is readily implemented on a moderate-precision arithmetic hardware architecture, such as a 16-bit processor, but is also successfully implemented on a variety of hardware architectures. The technique of the invention addresses the problem of error accumulation inherent in recursive oscillation, the problem of providing adequate frequency coefficient resolution inside individual oscillators, and the problem of providing computationally efficient additive synthesis on a variety of hardware platforms.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
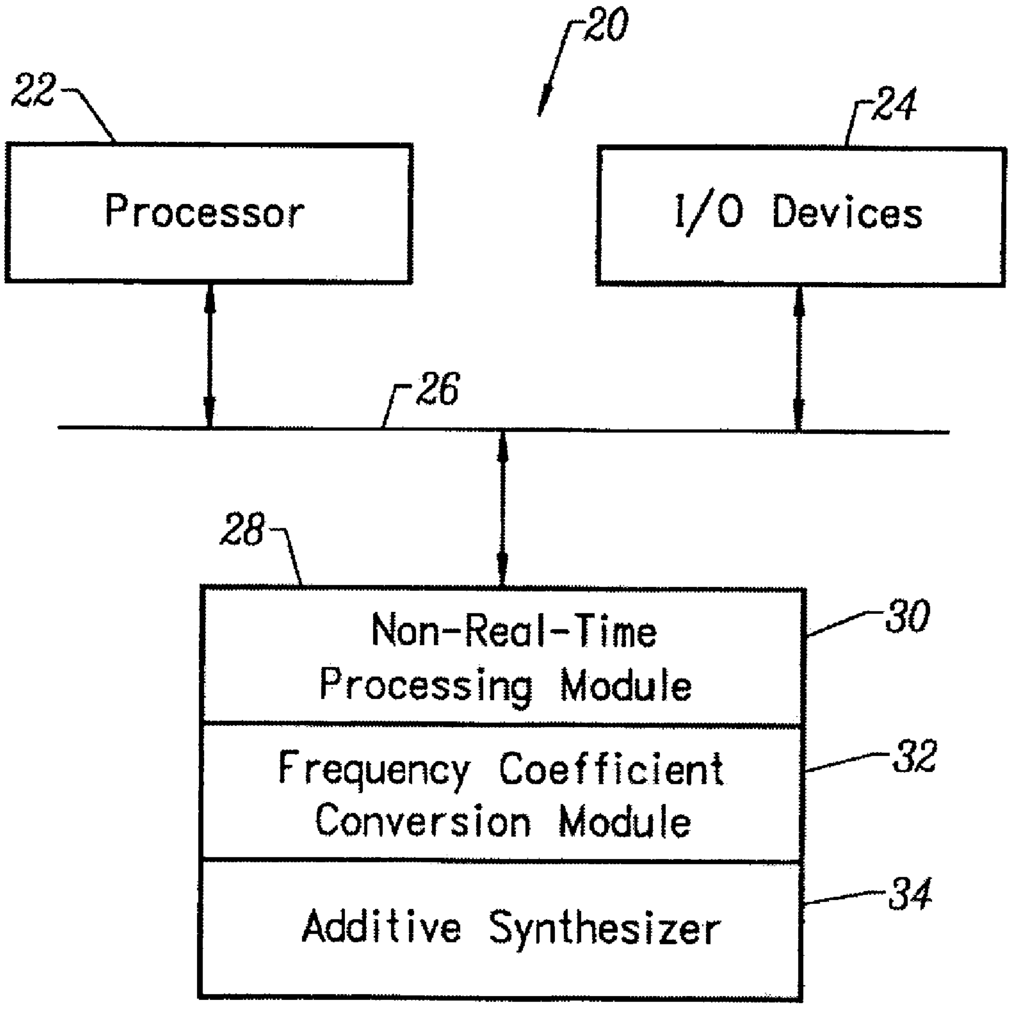
FIG. 1 illustrates an apparatus for implementing an embodiment of the invention.

FIG. 1 illustrates an apparatus 20 that may be used to implement an embodiment of the invention. The apparatus 20 includes the components associated with a general purpose computer. In particular, the apparatus 20 includes a processor 22, many variations of which are discussed below. The processor 22 is connected to a set of input/output devices 24 via a bus 26. The input/output devices 24 may include such components as a keyboard, mouse, speakers, video monitor, and the like.

A memory (primary and/or secondary) 28 is connected to the bus 26. The memory 28 stores a set of executable instructions used to implement the processing of the invention. In particular, the memory 28 stores a non-real-time processing module to perform prior art processing of the type described below. In accordance with the invention, the memory 28 also stores a frequency coefficient conversion module 32. As discussed below, the frequency coefficient conversion module 32 re-maps bits of a frequency coefficient representation to bias audio reproduction accuracy at the input/output devices 24 toward low frequency signals. An additive synthesizer 34 built using a new formulation of a prior art recursive oscillation technique is then used to process the linearly re-mapped bits of the frequency coefficient representation. For the purpose of convenience, the invention is frequently described in the context of a single recursive oscillator. This reference to a single recursive oscillator contemplates the use of multiple recursive oscillators operating in parallel to produce sound, as understood from the following discussion.

Figure 2:
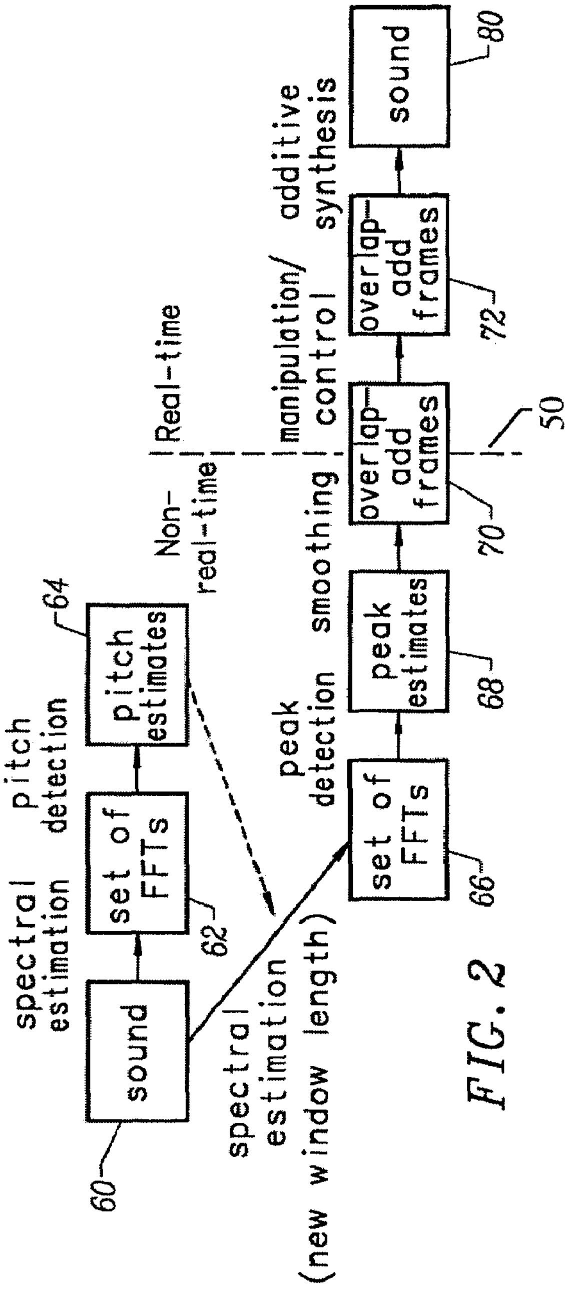
FIG. 2 illustrates an embodiment of the invention in the context of an analysis/re-synthesis framework, and identifies the processes in the framework that require real-time performance.

The invention is directed toward the frequency coefficient conversion module 32 and the additive synthesizer 34, which efficiently creates sound based on the output of the conversion module 32. The context in which this module operates and the operations that it performs are more fully appreciated with reference to FIG. 2. FIG. 2 illustrates an example of a complete additive analysis/synthesis system framework. The steps to the right of the thick dashed line 50 are computed in real-time by the frequency coefficient conversion module 32 and the additive synthesizer 34. The steps to the left of the line 50 are performed by the non-real-time processing module 30.

The concept behind this particular separation is that a set of sound primitives, expressed as sets of overlap-add frames, called timbral prototypes, can be generated off-line via the non-real-time steps as part of the compositional process. Then at performance time, sets of timbral prototypes are loaded into and out of memory 28 according to a score, where they can be manipulated and combined in response to controller input from a performer operating the input/output devices 24. The modified frames are then synthesized in real-time for subsequent audition. The use of such a paradigm enables additional degrees of freedom in performance than available through, for example, conventional sample-playback-based synthesis.

The processing associated with the present invention is directed toward the final step, that of taking a set of dynamically changing frames and synthesizing them into audio samples. The challenge of using a vector instruction set architecture is explicitly managing parallelism due to the independence of sinusoid computations. The technique of the invention exploits the natural coarse-grained parallelism by choosing to stripe state variables of sinusoids across the length of the vectors. The technique of the invention allows for implementation on a moderate-precision arithmetic unit (e.g., a 16-bit processor) using moderate-precision numeric representations. In particular, the invention provides sufficient frequency coefficient resolution by modifying a standard recursive form. The technique also reduces quantization-induced noise effects by keeping oscillators short-lived in order to exploit short-term fidelity.

The input to the frequency coefficient conversion module 32 is a series of variable-length overlap-add frames. A succession of such frames constitute a timbral prototype, which is either synthetically designed or derived through a separate analysis phase, as depicted in FIG. 2. The analysis phase may include the generation of a sound (block 60) from which spectral estimation is used to produce a set of fast Fourier transforms (block 62). Pitch is then detected to produce a set of pitch estimates (block 64). The pitch estimates are then used to identify new window lengths associated with the spectral estimation. This results in a new set of fast Fourier transforms (block 66). Peak detection is performed for the new fast Fourier transforms to produce new peak estimates (block 68). Smoothing is then performed on the peaks and an overlap-add frame operation (block 70) is then initiated. The frequency coefficient and conversion module 32 then performs coefficient re-mapping and frame stitching (overlap-add frames) (block 72), as discussed below. Sound 80 corresponding to the initial sound (block 60) may then be produced with an additive synthesizer 34 based on the recursive oscillator structure described below.

Each frame consists of a frame header and frame data. The frame header is a double-precision floating point time stamp denoting the start time of the frame and an integer denoting the number of partials in it. The frame data is a list containing the fixed frequency, peak amplitude, and initial phase for each sinusoid in the frame, all in single-precision floating point.

Figure 3:
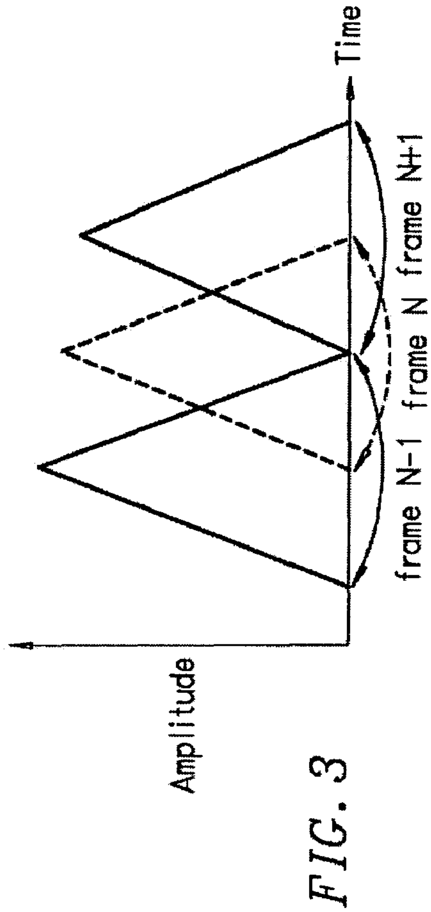
FIG. 3 illustrates overlapping audio frames processed in accordance with an embodiment of the invention.

At any instant of time, a timbral prototype is being synthesized as a weighted sum of two constituent frames. Each of the two sets of frame data are synthesized at a constant frequency and phase. Irrespective of their timestamps, successive frames are 50% overlapped with individual amplitude envelopes linearly increasing from zero to the specified peak amplitude value for the first overlapped portion of the frame, and linearly decreasing from this peak back to zero during the second portion of the frame. This is illustrated in FIG. 3. The two sets of scaled, overlapped frame partials are summed to constitute an output channel.

An important feature of this approach is that for individual generating oscillators, the frequency, phase, and amplitude remain constant. By overlapping and adding successive oscillators with the triangular amplitude envelope, two fixed-frequency, fixed-amplitude sinusoids closely approximate a single varying-frequency, varying-amplitude partial.

As previously indicated, there are many ways to generate sinusoids. The most common methods include various recursive techniques, table look-up, and transform domain methods, such as those using the inverse fast fourier transform. The present invention relies upon recursive techniques due to their heavy reliance on explicitly parallel arithmetic with fewer time-consuming memory accesses. In accordance with an embodiment of the invention, the following digital resonator, with no damping or initialization impulse function, is used:

$$x_n = 2\cos\left(\frac{2\pi f}{f_s}\right)x_{n-1} - x_{n-2}$$

with $f_s$ as the sampling frequency, and $f \in (0, f_s/2)$ as the desired (constant) frequency of oscillation.

To implement this equation using only sixteen-bit fixed-point multiplies, it is necessary to (1) manage the fixed-point units with enough precision to maintain accuracy across the entire audible frequency range, while (2) taking special care to provide sufficient frequency coefficient resolution to account for human ability to distinguish subtle differences in low frequencies. Accuracy must be maintained across a broader range and with more precision for low-frequency partials than a simple sixteen-bit fixed-point representation supplies. Additionally, because the frequency coefficient multiplication is in the critical path, it is desirable to minimize the computational overhead of the changes.

To quantify the issue, the minimum perceptible musical interval is specified. Afterwards, the resolution necessary to maintain relative frequency accuracy is calculated. Doing so indicates that the low-frequency components require more precision than higher ones—which is intuitive, since relative accuracy is being calculated. Thus, to minimize perceived error, the frequency coefficient representations are re-mapped in two ways: by employing an exponent internally to emulate floating-point range extension, and by inverting the bit representation to bias accuracy toward low frequencies. These changes require two new operations per filter per sample: an add with constant shift and a variable shift.

To understand the modifications to the filter, recall the original recurrence relation for the sine wave generator (with $$\left.\omega = \frac{2\pi f}{f_s}\right).$$

At low frequency, the co-efficient 2 cos(ω) is very close to two, and so in a floating-point format, lower frequencies synthesized using the formula will have less accuracy than higher-frequencies due to the need to explicitly represent the leading ones in the mantissa. Numbers closer to zero benefit from the implicit encoding of leading zeros via a smaller exponent. In other words, larger values require bits with larger "significance" (absolute value) forcing the least significant bits in the same word to also have higher significance, thus forcing higher worst-case quantization error. One can more effectively use the bits of the mantissa by reversing this relationship, recasting the equation as:

$$\chi_n = 2\cos(\omega)\chi_{n-1} - \chi_{n-2}$$

$$\chi_n = 2(1-\epsilon/2)\chi_{n-1} - \chi_{n-2}$$

$$\chi_n = 2\chi_{n-1} - \epsilon\chi_{n-1} - \chi_{n-2}$$

i.e., where $\cos(\omega) = (1-\epsilon/2)$.

To represent ε, an unsigned sixteen-bit mantissa m is combined with an unsigned exponent e, biased so that the actual represented value is $\epsilon = 2^{2-e}m$. Thus, the exponent is also the right shift amount necessary to correct a 16b×16b→32b multiply with ε as an operand. The two in the exponent allows ε to range from 0 to 4 when m is interpreted as a fractional amount and f ranges between zero and the Nyquist frequency.

What is achieved with this re-mapping of number representation (denoted as Re-Mapping for economy of language) is the ability to represent lower frequencies with more significant bits and mapping higher frequencies with less significant bits. In particular, as $2\cos(2\pi f/f_s)$ varies from −2 to 2, ε is defined to vary from 4 to 0. Smaller frequency values produce smaller values of ε, helping to satisfy asymmetric accuracy requirements of the human auditory system.

Initialization can be quickly accomplished in accordance with the invention. In particular, the resonator can be initialized to a desired frequency and phase at sample $x_o$ by properly choosing the two state variables $x_{-2}$ and $x_{-1}$ using function evaluations in place of an initialization forcing function. The lookup values for a sinusoid with phase p and frequency f are:

$$x_{-1} = \sin\left(p - \frac{2\pi d}{f_s}\right);\ x_{-2} = \sin\left(p - \frac{4\pi f}{f_s}\right)$$

These initializations must be accurate down to the low-order bits in a 32-bit fixed point representation, with the binary point set between the third and fourth bit positions in order to support a phase in the range [0, 2π]. In addition, it is necessary to compute the frequency coefficient 2−2 cos(ω) to 32-bit accuracy.

These initial evaluations can be computed more quickly by rewriting the equations for $\chi_{-1}$, and $\chi_{-2}$ in a form that requires only the computation of sin (p), cos(p), sin(ω), and cos(ω):

$$\begin{aligned}
\chi_{-1} &= \sin(p-\omega) \\
&= \sin(p)\cos(\omega) - \cos(p)\sin(\omega) \\
\chi_{-2} &= \sin(p-2\omega) \\
&= \sin(p)\cos(2\omega) - \cos(p)\sin(2\omega) \\
&= 2\cos(\omega)\sin(p-\omega) - \sin(p) \\
&= 2\cos(\omega)\chi_{-1} - \sin(p)
\end{aligned}$$

Figure 4:
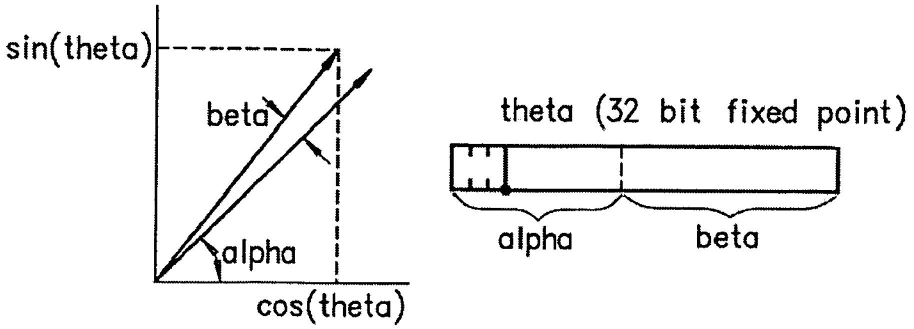
FIG. 4 illustrates the partitioning of a theta term into alpha and beta components in accordance with an embodiment of the invention.

It may seem that this has actually increased the amount of work to be performed because there are now four trigonometric evaluations rather than three (two initialization sines plus the cosine in the recursive form). However, this approach turns out to be more efficient by allowing for the judicious sharing of intermediate values in a tandem sine and cosine generation procedure. The tandem subroutine returns both $\sin(\theta)$ and $\cos(\theta)$ for $\theta \in [0,2\pi]$ to full 32-bit fixed-point precision using a hybrid technique combining table-lookup and Taylor expansion. This keeps both the table size manageable (2048 entries of 32 bits) and the number of terms in the Taylor expansions small (two). It is implemented by separating $\theta$ into $\alpha$ and $\beta$ as shown in FIG. 4; $\alpha$ is the high-order 11 bits of $\theta$, and $\beta$ the remaining low-order bits. $\alpha$ is used in an exact (to one LSB) 11-bit→32-bit table-lookups, while (guaranteed small) $\beta$ is used in Taylor expansions.

$$\cos(\beta) \approx 1 - \frac{\beta^2}{2} \text{ and } \sin(\beta) \approx \beta\left(1 - \frac{\beta^2}{6}\right)$$

The accuracy of expanding each to only two terms is guaranteed by limiting the size of $\beta$ to only the low-order 21 bits of $\theta$. the sum of the remaining terms in each expansion sequence, for all $\beta$, is less than the LSB. Finally, $\alpha$ and $\beta$ are combined using the relationships:

$$\sin(\alpha+\beta)=\sin(\alpha)\cos(\beta)+\cos(\alpha)\sin(\beta)\cos(\alpha+\beta)=\cos(\alpha)\cos(\beta)+\cos(\alpha)\sin(\beta)$$

Attention now turns to an error analysis performed in accordance with an embodiment of the invention. Relative frequency discrimination is based on the ratio of adjacent frequencies. To determine worst-case relative error, it is desirable to determine the maximum ratio between two adjacent $\epsilon$ values. Call these frequency coefficients $\epsilon_1$ and $\epsilon_2$, and their corresponding frequencies $f_1$ and $f_2$. From the definition of $\omega$ and the equation $\cos(\omega)=(1-\epsilon/2)$, $$\frac{f_1}{f_2} = \frac{\cos^{-1}(1-\varepsilon_1/2)}{\cos^{-1}(1-\varepsilon_2/2)}$$

Taking any two adjacent numbers in the range, one can compute $f_1$ and $f_2$ with the foregoing equation. Evaluating this ratio for all possible adjacent pairs of epsilon values allows one to determine that it is maximized for $\epsilon_1=4-2^{-14}$ and $\epsilon_2=4-2^{-13}$, where $f_1/f_2=1.0010337$. This ratio is lower than the minimum frequency ratio humans are able to differentiate, a pitch difference of approximately four to five cents (about 1/25-1/20 of a semitone). The maximum error of the algorithm is actually less than two cents: $600\sqrt{2} \approx 1.001156$.

This calculation illustrates that by designing higher $\epsilon$ values to coincide with higher represented frequencies, a good match of the numerical representation to the asymmetric accuracy requirements of human logarithmic pitch perception is achieved.

Two tones that are meant to have an exact ratio in their frequencies may instead generate beat frequencies due to frequency quantization. This effect, caused by absolute error, should be minimized.

Figure 5:
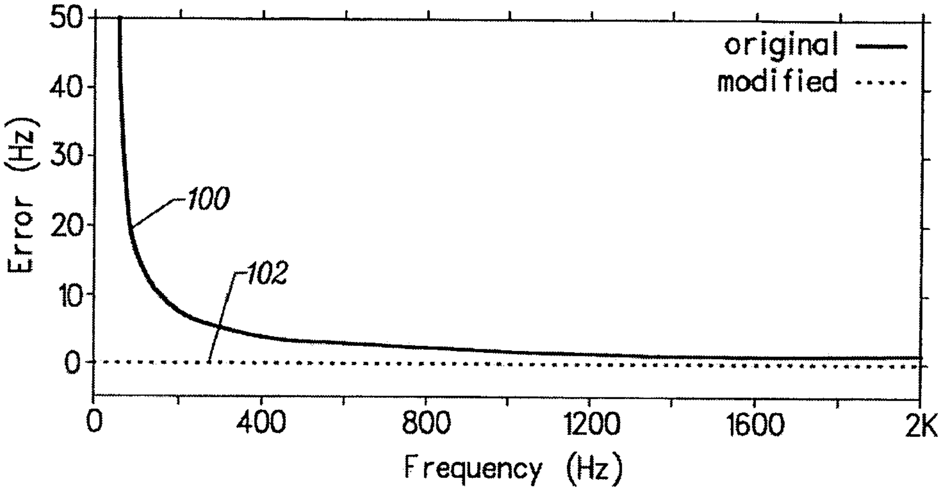
FIG. 5 illustrates a comparison of original absolute error due to coefficient quantization error, and the modified error achieved in accordance with an embodiment of the invention.
Figure 6:
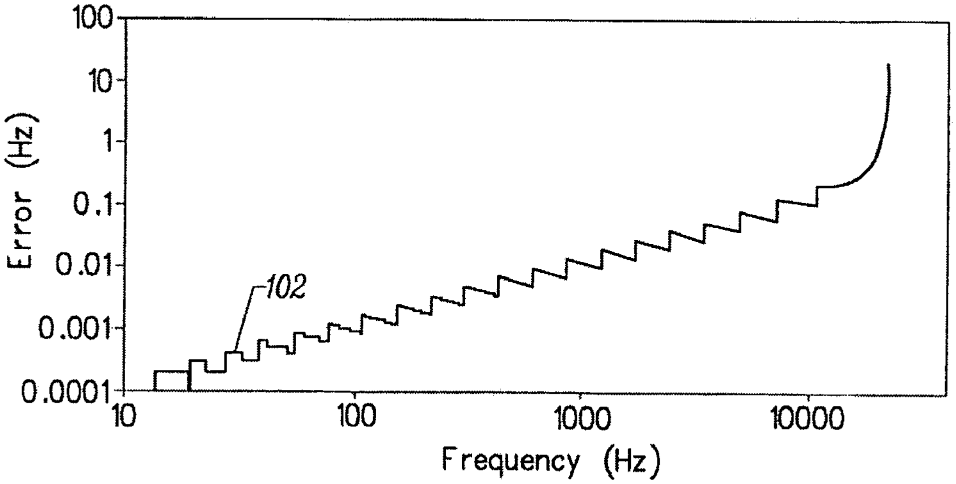
FIG. 6 is a detailed illustration of the modified absolute error due to coefficient quantization error achieved in accordance with an embodiment of the invention.

Worst-case absolute error due to epsilon quantization is shown in FIG. 5, which contains a side-by-side comparison below 2000 Hz for an original signal 100 and a modified signal 102. FIG. 6 is a more detailed representation of the modified signal 102. As expected, the recast filter maintains more precise absolute frequency than the original form.

Fundamentally, more than 16 bits of fractional co-efficient are necessary to obtain 1 Hz absolute precision across the audible spectrum. The method of the invention maintains reasonable error bounds in sixteen bits of mantissa by scaling these bits with the exponent.

At each iteration of the recursive form, a small error is introduced due to rounding of the multiply result. Due to the recursion, this error isn't corrected until reinitialization of the state variables. Possible effects of this include degradation of the signal-to-noise ratio, degradation of the long-term phase accuracy, and a lack of amplitude stability-all of which can cause audible artifacts.

These problems can be corrected via additional computations, but to avoid additional computations, the invention exploits the ability to reinitialize the computation at overlap-add frame boundaries, thereby allowing use of a non-self-correcting (but higher-performance) digital oscillator form described below.

In one embodiment, the invention was implemented on a neural network and signal processing accelerator board. This embodiment included a T0 chip, a 16-bit fixed point vector arithmetic core developed by the University of California at Berkeley and the International Computer Science Institute. The T0 chip tightly couples a general-purpose scalar MIPS core to a high-performance vector coprocessor. T0 is representative of digital signal processing architectures in its use of fixed-point arithmetic. In order to compute summations of oscillators for additive synthesis with an overlap-add approach for a pseudo-floating-point format, four multiplies, two variable shifts, two fused (constant) shifts and adds, and two regular adds are required:

$$\chi_n=2\chi_{n-1}-\epsilon\chi_{n-1}+\chi_{n-2}$$

$$A_n=A_{n-1}+\Delta A$$

$$\text{out}_1=\text{out}_1+A_n\times\chi_n$$

A coded module implementing the foregoing expressions constitutes an additive synthesizer 34 in accordance with the invention. Observe that this additive synthesizer 34 incorporates prior art components of additive synthesis (the idea of using an analysis step followed by a re-synthesis step), and the general approach of using recursive oscillators. However, the additive synthesizer 34 represents a new formulation of prior art recursive oscillation techniques in its use of a modified filter equation, its use of modified coefficient representations, and the explicit consideration of the human auditory system to provide additional computational efficiency.

On T0, the implementation of the additive synthesizer 34 requires a total of $9+^1/n$ Vector arithmetic operations per sinusoid when unrolled n times. Unrolling four times due to trade-offs in register file pressure on T0, one achieves best-case performance of about 1.15 cycles/partial: two fixed-frequency sinusoids are required per variable-frequency partial because of overlap-add, 9 operations are required per sine, two cycles are required per vector operation on T0, and the vector length is 32 elements. Thus, in this embodiment, performing 8 operations per cycle (peak) with a 40 MHz clock rate and at a 44.1 kHz sampling rate, a theoretical maximum of 768 partials can be achieved in real time excluding all overhead. The current implementation supports up to 608 simultaneous real-time partials with frame lengths of 5.8 ms or greater, or about 1.5 cycles per partial per sample.

The invention may also be implemented on a Digital Signal Processor. Although Digital Signal Processors typically do not have flexibly configured vector pipelines, these processors support several different vector operand sizes, including single precision floating point, 16-bit and 32-bit fixed point. Operand size and coefficient alignment can be exploited according to desired frequency and amplitude of each sinusoidal signal sequence.

The invention may also be implemented in Field Programmable Gate Arrays (FPGAs). Such processors allow for the creation of new, specialized arithmetic operations on a per instruction and per sinusoidal sequence basis. This allows use of lattice filter structures and sinusoidal synthesis algorithms, such as quantizers, error feedback, and nonlinear operations, which are presently limited to custom hardware processors.

Very Long Instruction Word (VLIW) processors may also be used to implement the invention. These processors have multiple concurrent arithmetic units, but use long instructions to control them rather than the vector processor's limited, but compact vector instructions. Like vector processors, VLIW processors benefit from algorithms exhibiting good locality of reference. The simplicity and regularity of the second order recursive kernels used in this invention allows the VLIW compiler to efficiently map the algorithm to a particular VLIW processor and more importantly allows for effective code generation in applications where other algorithms are performed concurrently with the sinusoidal models, such as the high level parametric control structures for models.

The invention may also be implemented in RISC processors. Performance of these processors depends on instruction order and cache utilization, both of which can be optimized on the basis of desired frequency and phase to most accurately and efficiently compute the approximating sinusoidal sequences.

Since transform domain methods also work well for these superscaler RISC processors, it is necessary to consider further advantages of the present invention over transform domain methods. The first advantage is computational: since in this invention the sinusoids are computed directly and individually, no cost for a final transform is incurred. This cost is especially significant when multiple independent channels of summed sinusoids are required since a transform is required for each channel. Transform domain methods cannot output elements of the output sequence until the entire transform is performed. The resulting latency is avoided in this invention because each element of the sinusoidal sequence may be stitched to its predecessor sequence and be driven as output as soon as it is computed.

Another advantage of the invention is in connection with cache memory utilization. This invention does not require a tabulated frequency domain window function at all and the triangular window function it does require for the stitching need not be tabulated as it may be computed with sufficient accuracy by accumulation. This invention therefore affords a straight-forward implementation of the window stitching operations for any sequence length. Transform domain methods favor window sizes which are powers of 2 or 3 and require considerable complexity to dynamically change window sizes.

The invention may also be implemented on processors using a Residue Number System. These processors are not widely deployed because of the high cost of conversion of numbers from traditional 2's complement representation. This problem is largely avoided with this invention since only the coefficients need to be converted for each sinusoidal sequence. The sequences themselves can be efficiently computed using Residue Number System arithmetic.

The invention may also be implemented on processors with a complex arithmetic kernel. Such processors efficiently implement a vector rotation as a single complex multiply. If the norm of a constant multiplicand is set to unity, a first-order, complex vector rotation is mathematically equivalent to a second order real coefficient system. In practice, the complex arithmetic kernel may be superior because it exhibits smaller quantization errors.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A computer readable medium encoded with computer executable instructions comprising:

a first set of executable instructions to receive digital audio signal frames wherein each digital audio signal frame has a set of specified frequency values expressed as a bit sequence;

a second set of executable instructions to Re-Map said bit sequence to represent lower frequencies with more significant bits and higher frequencies with less significant bits; and a third set of executable instructions to facilitate additive synthesis of said digital audio signal frames in a reduced-precision recursive digital oscillator wherein said recursive digital oscillator generates frequency f lying in the range from zero to one-half of a sampling frequency $f_s$ including recursion coefficients xn given by $x_n=2x_{n-1}-\epsilon x_{n-1}-x_{n-2}$, wherein $\epsilon=2-2\cos(\omega)$ and wherein $\omega=2\pi f/f_s$, and and wherein said Re-Mapping biases the generating frequency of said oscillator, whereby $\epsilon$ is represented by an unsigned mantissa, m, combined with an unsigned exponent, e, biased so that the actual represented value is $\epsilon=2^{2-e}m$.

2. The computer readable medium of claim 1 wherein said first set of executable instructions include instructions to identify a frequency coefficient representation of said specified frequency.

3. The computer readable medium of claim 2 further comprising a fourth set of executable instructions to define said frequency coefficient representation with an exponent characterizing a floating-point range extension.

4. The computer readable medium of claim 3 wherein said fourth set of executable instructions include instructions to specify said exponent to correspond to a right shift amount necessary to correct for precision limitations introduced by a reduced precision processor.

* * * * *